(12) United States Patent
Chen et al.

(10) Patent No.: US 9,401,121 B2
(45) Date of Patent: Jul. 26, 2016

(54) NETWORK VISUALIZATION THROUGH AUGMENTED REALITY AND MODELING

(71) Applicant: Futurewei Technologies, Inc., Plano, TX (US)

(72) Inventors: Yunxia Chen, Fremont, CA (US); Xiangdong Shi, San Ramon, CA (US)

(73) Assignee: Futurewei Technologies, Inc., Plano, TX (US)

( * ) Notice: Subject to any disclaimer, the term of this patent is extended or adjusted under 35 U.S.C. 154(b) by 830 days.

(21) Appl. No.: 13/629,209

(22) Filed: Sep. 27, 2012

(65) Prior Publication Data

US 2014/0085335 A1 Mar. 27, 2014

(51) Int. Cl.
*G09G 5/00* (2006.01)
*G06T 19/00* (2011.01)

(52) U.S. Cl.
CPC ............... *G09G 5/00* (2013.01); *G06T 19/006* (2013.01); *G09G 2340/12* (2013.01); *G09G 2354/00* (2013.01)

(58) Field of Classification Search
CPC ..................................................... G06T 19/006
See application file for complete search history.

(56) References Cited

U.S. PATENT DOCUMENTS

| 7,991,157 B2* | 8/2011 | Rhoads ........................ 380/247 |
| 8,026,929 B2* | 9/2011 | Naimark ....................... 345/629 |
| 2006/0152434 A1* | 7/2006 | Sauer et al. ........................ 345/8 |
| 2009/0201850 A1* | 8/2009 | Davis ................... G01S 5/0009 370/328 |
| 2010/0277504 A1 | 11/2010 | Song |
| 2011/0115816 A1* | 5/2011 | Brackney ...................... 345/629 |
| 2011/0134108 A1 | 6/2011 | Hertenstein |
| 2011/0164163 A1* | 7/2011 | Bilbrey et al. ........... 348/333.01 |
| 2012/0069051 A1* | 3/2012 | Hagbi et al. .................. 345/633 |
| 2012/0105202 A1* | 5/2012 | Gits et al. ....................... 340/8.1 |
| 2012/0212398 A1* | 8/2012 | Border et al. ..................... 345/8 |

* cited by examiner

*Primary Examiner* — Kee M Tung
*Assistant Examiner* — Whitney Pointe
(74) *Attorney, Agent, or Firm* — Conley Rose, P.C.; Grant Rodolph; Adam J. Stegge

(57) ABSTRACT

A user equipment (UE) comprising a display, an input device configured to receive user input, a visual input configured to capture motion or stop photography as visual data, and a processor coupled to the display, input device, and visual input and configured to, receive visual data from the visual input, overlay a model comprising network data onto the visual data to create a composite image, wherein the model is aligned to the visual data based on user input received from the input device, and transmit the composite image to the display.

17 Claims, 7 Drawing Sheets

NETWORK VISUALIZATION THROUGH AUGMENTED REALITY AND MODELING

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In order to perform network layout planning, optimization, and maintenance, network technicians may be required to locate and ascertain the status of the network's elements (NEs). This process may become problematic in situations where the network comprises many NEs, the technician is unfamiliar with the facility that houses the network, network components are obscured from view, and/or network components are not clearly labeled. These problems may be exacerbated by the utilization of mobile network elements that may be moved around the facility by other users. Such mobile network elements may not remain in predictable locations and may be difficult to locate on demand.

SUMMARY

In one embodiment, the disclosure includes a user equipment (UE) comprising a display, an input device configured to receive user input, a visual input configured to capture motion or stop photography as visual data, and a processor coupled to the display, input device, and visual input and configured to, receive visual data from the visual input, overlay a model comprising network data onto the visual data to create a composite image, wherein the model is aligned to the visual data based on user input received from the input device, and transmit the composite image to the display.

In another embodiment, the disclosure includes a method comprising importing a model of a location, wherein the location comprises a plurality of physical features, and wherein the model comprises a plurality of features that represent the physical features of the location, overlaying the model onto a first visual data received from a visual input to create a first composite image and displaying the first composite image to a user, receiving from the user, via an input device, a first user input that aligns a feature of the model with a physical feature of the location in the first visual data, and overlaying the model, as aligned by the user, onto a second visual data received from the visual input to create a second composite image and displaying the second composite image to the user.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for accurately displaying the physical position of NEs. A user may employ a UE that comprises a visual input, such as a camera, a display, a data input, and position sensors. The UE may import a model of a location, such as a three dimensional (3D) model of a building, from a database and allow the user to select the UE's approximate position on the model. The database may be stored on the UE or on a profile server accessible to the UE. The UE may overlay the model onto visual data from the visual input to create a composite image for display to the user. The user may calibrate the UE via the data input by aligning a portion of the model with a feature of the location. The UE may access a network layout from the database and load the layout onto the model. The UE may overlay the NEs and any associated network data onto the visual data from the visual input to create a composite image for display to the user. The location of the NEs on the composite image may be determined by a correlation between the model and the location based on the calibration. As the user moves the UE, data from UE's position sensors may be employed to determine the nature of the UE movement, and the location of the network data on the composite image may be adjusted accordingly. The model may or may not be displayed to the user once calibration is complete. The location of the NE's as displayed by the UE may be accurate to within about 0.5 meters to about 1 meter, about 1 meter to about 3 meters, or about 0.5 meters to about 3 meters.

Figure 1:
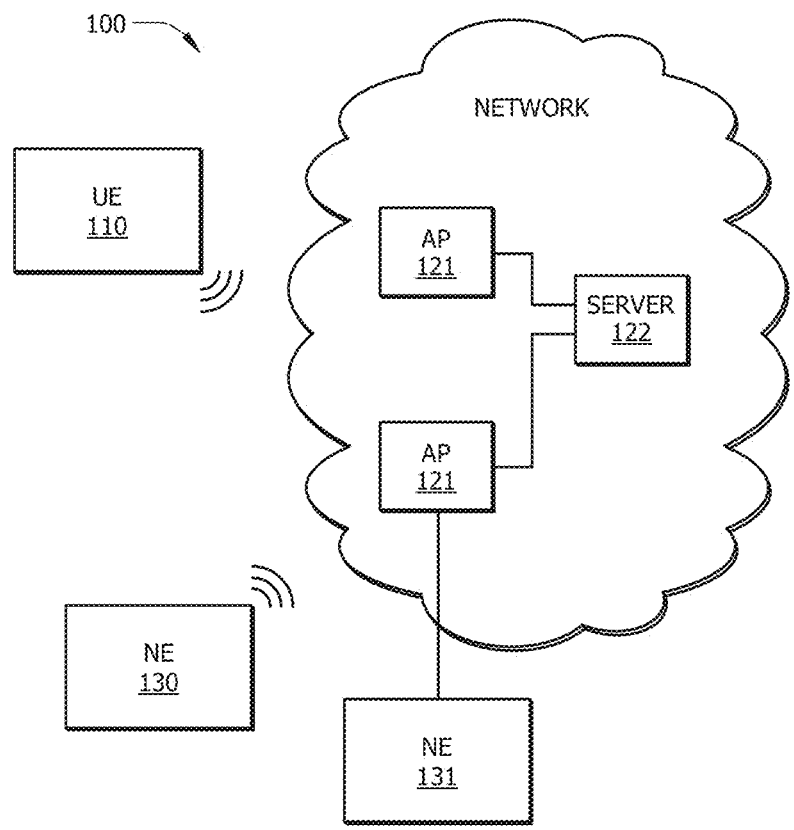
FIG. 1 is a schematic diagram of a network architecture for supporting network visualization by a UE.

FIG. 1 is a schematic diagram of a network architecture 100 for supporting network visualization by a UE 110. The network 100 may comprise a server 122 connected to NEs 130-131 via access points (APs) 121, which may also be considered NEs. The UE 110 and NEs 130-131 may connect to the server 122 via the APs 121 via wired (e.g. NE 131) or wireless (e.g. NE 130) communication.

The NEs 130-131 may comprise UEs, computers, printers, routers, switches, wireless access points, servers, and/or other network components that support the connectivity of UEs to the network 100. NE's 130-131 may also support the connectivity of UEs to the Internet via the network 100. NE 131 may connect to an AP 121 via a wired connection, while NE 130 may connect to an AP 121 via a wireless connection. As a wired device, the physical location of NE 131 may remain relatively constant while the physical location of wireless NE 130 may change over time based on user movement. The NEs 130-131 may be assigned Ethernet internet protocol (IP) addresses, subnet masks, and/or other identifying connectivity information to support network communication. Each NE may further comprise ports and/or interfaces which may be designated by the NE and/or network and employed to connect to the other network components via wired links, wireless connections, etc.

The IP addresses, connectivity information, port designations, interface designations, and/or link information of the NE's 130-131 and APs 121 may be collected by the server 122 and stored as network data. The server 122 may also collect, calculate, and/or store as network data the physical locations of the NE's 130-131 and/or APs 121 at a specified time (e.g. via Global Positioning System (GPS) sensors installed in the NE's 130-131 and/or APs 121, triangulation based on network signals, etc.) The server 122 may update the network data that comprises the physical location of an NE (e.g. wireless NE 130) as the NE is moved by a user (e.g. the physical location changes) in the normal course of operation. Such updates may be event based and/or periodic. In addition or in the alternative, the server 122 may store key performance indicators (KPIs) associated with the NEs 130-131, APs 121, and/or related links as network data. KPIs may encompass a broad range of indicators and/or metrics that are designed to indicate the connectivity status of an NE. As a non-limiting example, KPIs may include device availability, interface availability, link availability, bandwidth usage, link performance, data latency, quality of service (QoS) statistics, packet loss, device health, routing statistics, device uptime, etc. KPIs may also vary based on network implementation and may be customized to indicate various aspects of NE and/or network health.

UE 110 may be employed by a user, such as a network technician that wishes to visualize the network 100. The UE 110 may comprise a visual input, such as a still or video camera capable of capturing motion or stop photography as visual data. The UE 110 may also comprise a display configured to display visual data, and an input device for receiving user input. The UE 110 may import a model of a location that comprises all or part of the network 100. The model may also comprise network data associated with NE's 130-131 and/or APs 121. The model and/or the network data may be received from the server 122, stored in memory at the UE 110, or combinations thereof. The UE 110 may overlay the model onto the visual data from the visual input to create a composite image (e.g. a single image or video images). The UE 110 may then display the composite image comprising the network data to the user via the display. The user may calibrate the UE 110 by aligning a feature of the model (e.g. a corner or a wall of a model building) with a feature of the location captured in the visual data (e.g. a corresponding corner or wall of building) via the input device. The UE 110 may also comprise position sensors such as global position system (GPS) sensors, magnetometers, accelerometers, gyroscopes, and/or other sensors, which may indicate the position and/or motion of the UE 110 as position or motion data. Once calibrated, the UE 110 may maintain a congruence between the model and the location as the UE 110 moves so that the network data may appear in an accurate position relative to the user's point of view. The UE 110 may maintain the congruence by moving the model to correspond to the movement of the UE as indicated by the position sensors.

Figure 2:
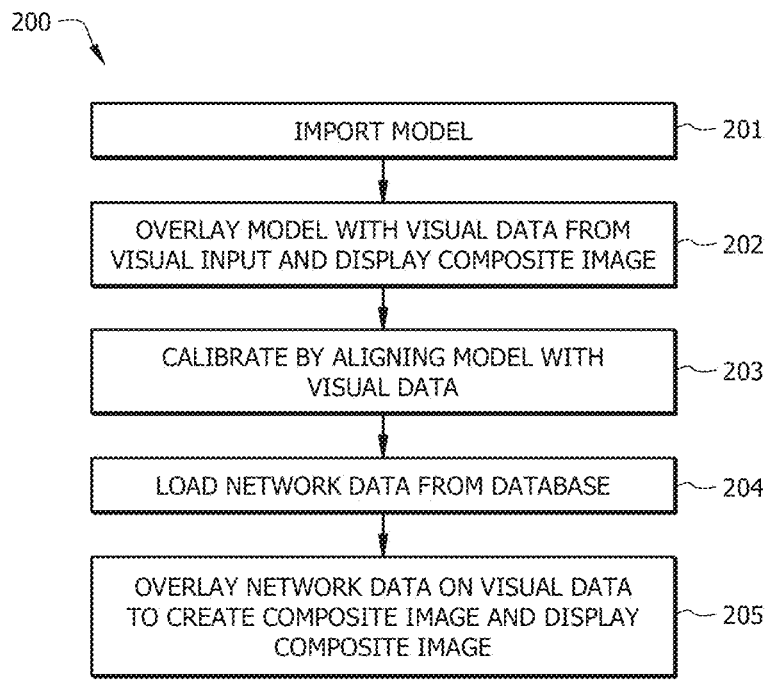
FIG. 2 is a flowchart of a method of overlaying a model comprising network data onto visual data.

FIG. 2 is a flowchart of a method 200 of overlaying a model comprising network data onto visual data, for example by a UE such as UE 110. At block 201, the UE may import a model of a location. A location may be a geographical, topographical, or other designated area on the Earth's surface. A model of a location may be a three dimensional (3D) or two dimensional (2D) representation of the location. For example, a network such as network 100 may be housed in a building and UE 110 may import a 3D architectural model of the building. The method may then proceed to block 202.

At block 202, the UE may overlay the model onto visual data captured by the UE's visual input to create a composite image and display the composite image to the user. The model may be overlaid based on user input or based on data from position sensors. For example, the model may be displayed to the user, and the user may be prompted to select a position on the model that approximates the user's position in the location. As an additional or alternative example, the model may comprise position data such as GPS coordinates of points on the model that correspond to points at the location. The UE may compare position data from the UE's position sensors to the position data of the model to determine the initial position of the model. Once the model is positioned relative to the user, the UE may overlay the model onto visual data to approximate the user's point of view and proceed to block 203.

At block 203, the UE may prompt the user to calibrate the UE by aligning the model with visual data of the location as captured by the visual input. For example, the location may comprise a plurality of easily distinguishable physical features such as walls, floors, corners, etc. The model may comprise features that represent and correspond to the physical features of the location. The user may alter the orientation of the model, the angle of the model, and/or the apparent size of the model by spinning the model in two or three dimensions, zooming the view of the model in or out, etc. The user may continue to alter the view of the model until one or more features of the model appear to closely correspond with the physical features of the location. Once a correspondence between the model and the location has been determined, the UE may be configured to accurately overlay the model onto the visual data from the visual input so that portions of the model appear in the same position as portions of the location relative to the user's point of view. The model may be displayed in a semitransparent fashion to aid in calibration. Once calibration is completed, the method 200 may proceed to block 204.

At block 204, the UE may load network data into the model from a database. The database and/or model may be stored in UE memory, in which case dynamic network data may be unavailable. Alternatively, the database and/or model may be stored on a server and transmitted to the UE periodically or on demand, in which case dynamic network data may be available, but may be subject to latency. In yet another alternative, portions of the database and/or model may be continuously streamed to the UE via a wired or wireless connection. The network data may comprise the position of NE's relative to the model and the network data may be used to place the NE's and network data associated with each NE into the appropriate position(s) in the model. The method may then proceed to block 205.

At block 205, the UE may overlay the model and/or associated network data onto the visual data to create a composite image and may display the composite image to the user. The model may be visible, semitransparent, or completely transparent, depending on the implementation and/or the user's preference. Regardless of the transparency of the model, the network data positioned on the model may be displayed to the user. For example, the user may view the display of the UE, and the network data may appear in approximately the same position relative the user as the NE associated with the network data. By viewing the display, the user may 'view' NEs that are obscured from actual view by walls, drawers, etc. The UE may move the model in accordance with the movement of the UE, which may cause the positions of the NEs to remain in proper position relative to the user's point of view as the UE moves. The use of a model to position the NEs may result in NE positioning that is accurate to within about 0.5 meters to about 1 meter, about 1 meter to about 3 meters, or about 0.5 meters to about 3 meters.

Figure 3:
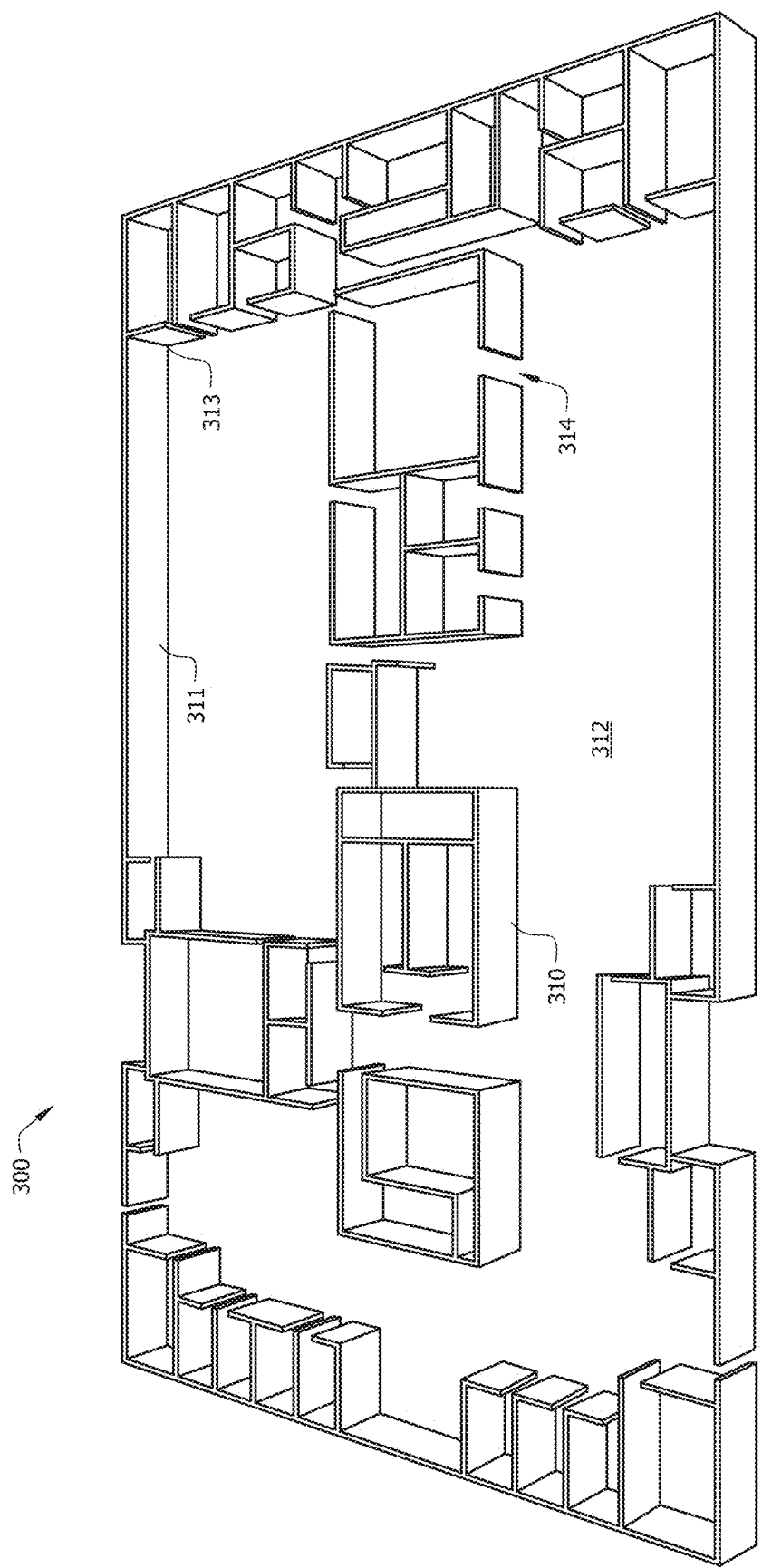
FIG. 3 is a schematic diagram of an embodiment of a model of a location.

FIG. 3 is a schematic diagram of an embodiment of a model 300 of a location, which may be imported at block 201 of method 200. The model 300 may be a 3D representation of the location, for example a floor plan. The model 300 may comprise features that correspond to physical features associated with the location, for example internal walls 310, external walls 311, floor space 312, corners 313 where features connect, and/or doorways 314. The features of the model 310-314 may be aligned with the physical features of the location to calibrate a UE, for example in method 200.

Figure 4:
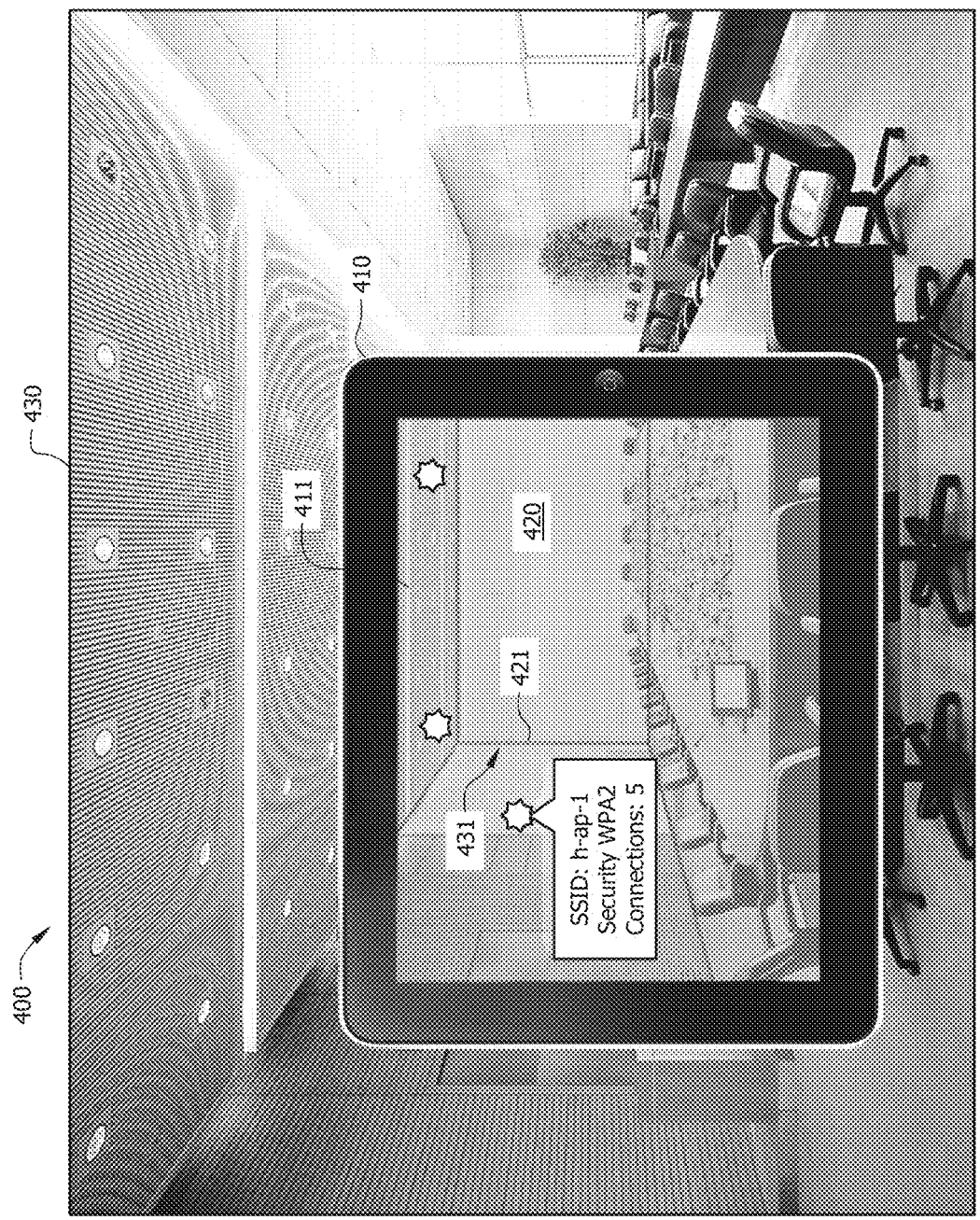
FIG. 4 is illustration of an embodiment of a UE being calibrated.

FIG. 4 is an illustration 400 of an embodiment of a UE 410 being calibrated, for example at block 203 of method 200. UE 410 may be substantially similar to UE 110 and may comprise a display 411. The UE 410 may be employed in a location 430. The location 430 may have physical features 431 such as walls, corners, ceilings, floors, etc. The display 411 may comprise a model 420, which may be substantially similar to model 300 and may be overlaid onto visual data and displayed to a user at block 202 of method 200. The model 420 may comprise features 421 that correspond to the physical features 431 of the location 430, such as walls, corners, ceilings, floors, etc. The user may calibrate the UE 410 by aligning a feature 421 of the model 420 with a physical feature 431 of the location 430. For example, the user may align a wall of the model 420 with a wall of the location 430 in the UE display 411. The user may rotate the model in three dimensions as well as zoom in and out until the location and size of the model features 421 approximately match the location features 431.

Figure 5:
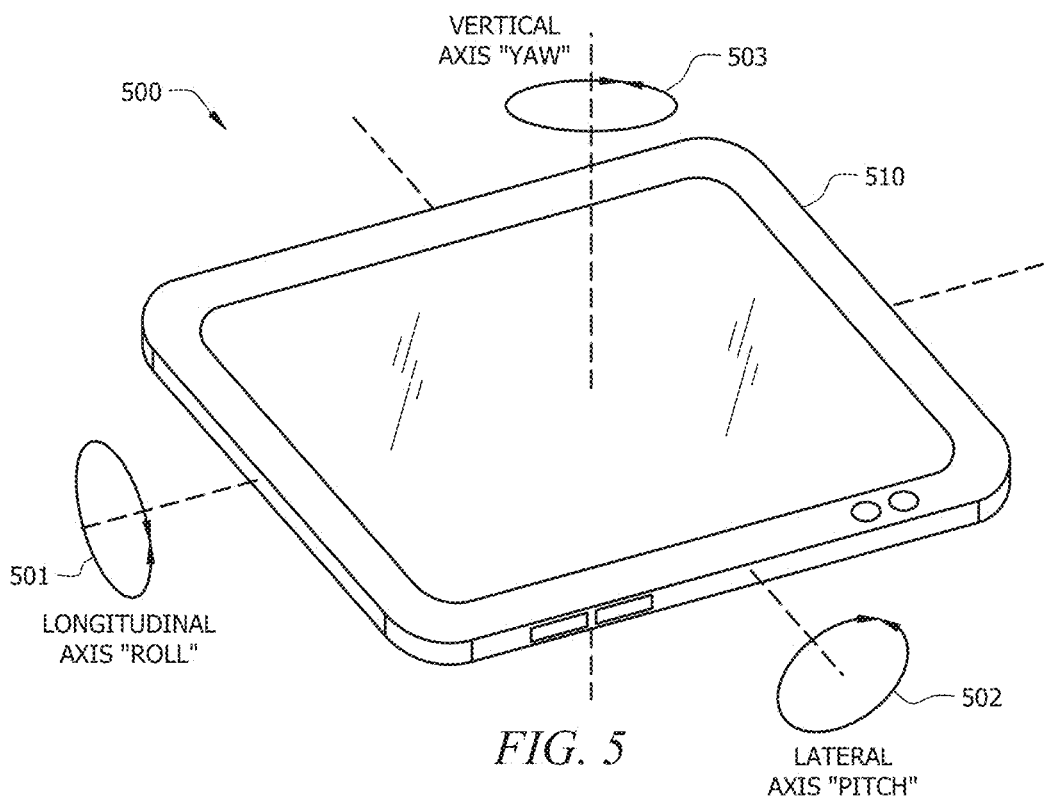
FIG. 5 is a schematic diagram of an object described by roll, pitch, and yaw.

FIG. 5 is a schematic diagram of an object 500 described by roll 501, pitch 502, and yaw 503. The rotation of an object 500 in a three dimensional space may be described in terms of angles of roll 501, pitch 502, yaw 503, and/or combinations thereof. The rotation of an object around a longitudinal axis, a lateral axis, and a vertical axis, may be described as changes in the angle of roll 501, pitch 502, and yaw 503, respectively.

Figure 6:
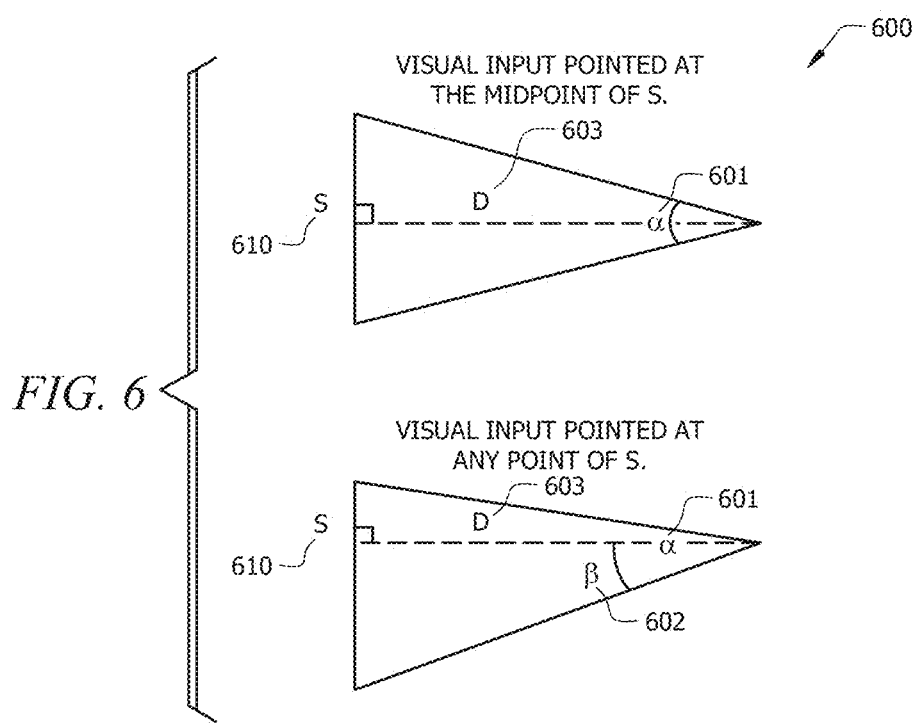
FIG. 6 is a depiction of a congruence between a model and a UE after calibration.

FIG. 6 is a depiction 600 of a congruence between a model, such as model 300, and a UE, such as UE 310, after calibration (e.g. block 203 of method 200). The orientation of a UE may be described by the angles yaw, pitch, and roll (e.g. roll 501, pitch 502, and yaw 503). The primary angle ($\alpha$) 601 (e.g. roll, pitch, or yaw) of a UE visual input to a physical feature in a location may be related to the size of the feature (S) 610 and distance to the feature (D) 603 by the equation $S=2*D*\tan(\alpha/2)$ when the center of the visual input is pointing at the mid-point of the feature. When the center of the visual input is not pointing at the mid-point of the feature, the relationship may be described by the equation $S=D*\tan(\beta)+D*\tan(\alpha-\beta)$, where secondary angle ($\beta$) 602 is the angle between the midpoint of the feature and the point to which the center of the visual input is pointing. Calibration (e.g. block 203) may determine $\alpha$ 601, $\beta$ 602, and/or D 603.

D 603 may be calculated when a physical feature in the visual data and a feature of the model are aligned because aligning the features may cause S 610, $\alpha$ 601, and $\beta$ 602 of the physical feature and the model feature to match. The distance (e.g. D 603) between the UE and the feature may be used to determine the position of the UE relative to the feature and may be used to position the model features relative to the visual data. The view of the model may then be moved based on position and/or motion data from the position sensors to maintain a congruence between the model and the location.

When the UE moves, the angle of rotation (e.g. roll, pitch, or yaw) as measured by the position sensors of the UE (A) may be related to the actual angle of rotation (A') by the equation $A'=A+\Delta A(A, t)$ where $\Delta A$ is the error of the measurement over time (t). Such measurement errors may fluctuate over time and orientation based on the implementation of the position sensors (e.g. gyroscope, magnetometer, etc.) At any t, the UE may be calibrated by rotating a view of the model to match the visual input view, which may offset the measured A' with $\Delta A$ to get the actual A. Because $\Delta A(A, t)$ is a function of A and t, $\Delta A$ may fluctuate over time at the same orientation and $\Delta A$ may fluctuate as the UE changes orientation. Averaging consecutive measurements may reduce random fluctuations in $\Delta A$ over time. Orientation based fluctuation may be solved by requiring additional calibration via alignment.

Figure 7:
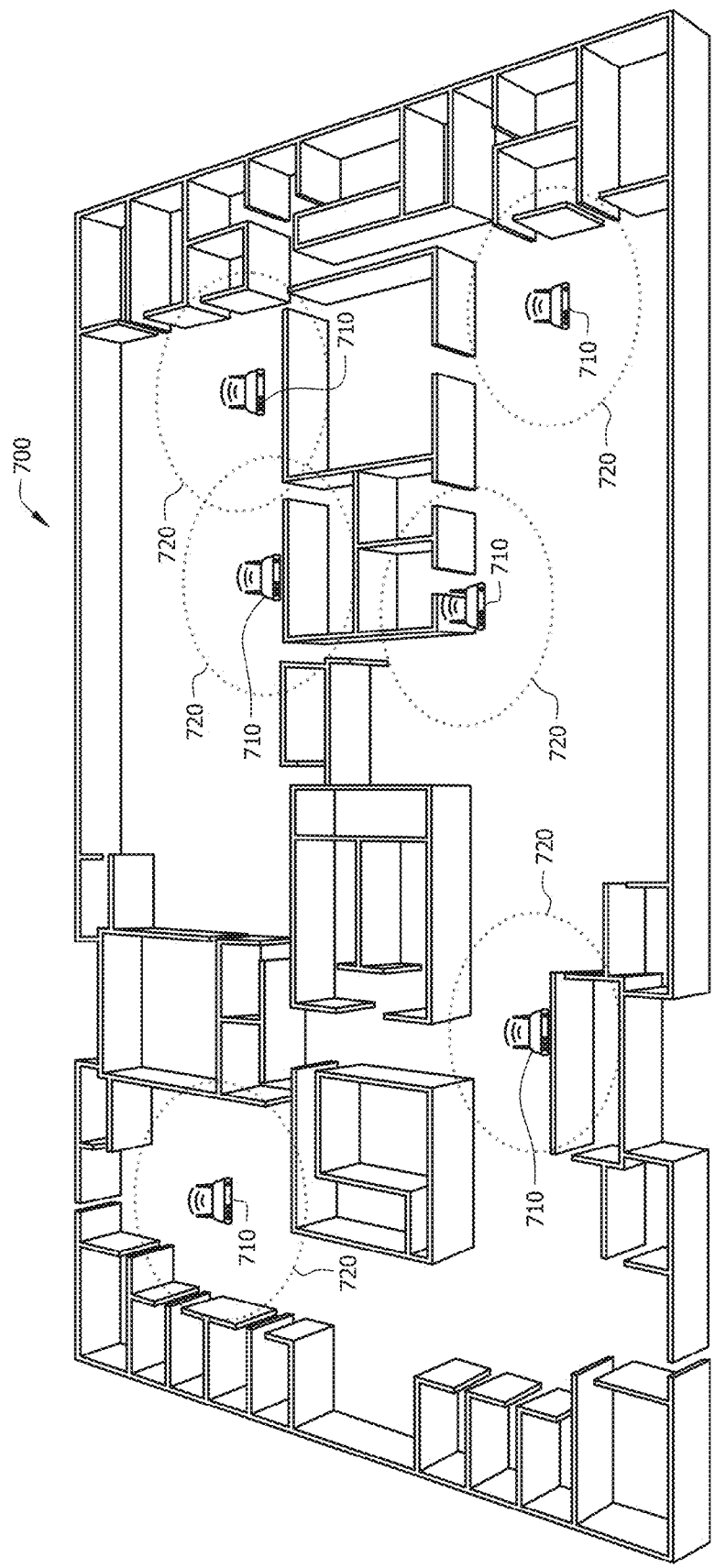
FIG. 7 is a schematic diagram of an embodiment of a model of a location comprising network data.

FIG. 7 is a schematic diagram of an embodiment of a model 700 of a location comprising network data. For example, model 700 may be substantially similar to model 300, but may comprise network data as the result of block 204 of method 200. The model 700 may comprise NEs 710 and NE transmission ranges 720. A UE and/or server may load the NEs 710 and transmission ranges 720 onto model 300, for example at block 204, which may result in model 700. The NEs 710 and transmission ranges 720 may be loaded onto the model based on the current position of the NEs 710 and/or based on a fixed position for each NE 710. Model 700 may comprise additional network data as needed in a particular implementation.

Figure 8:
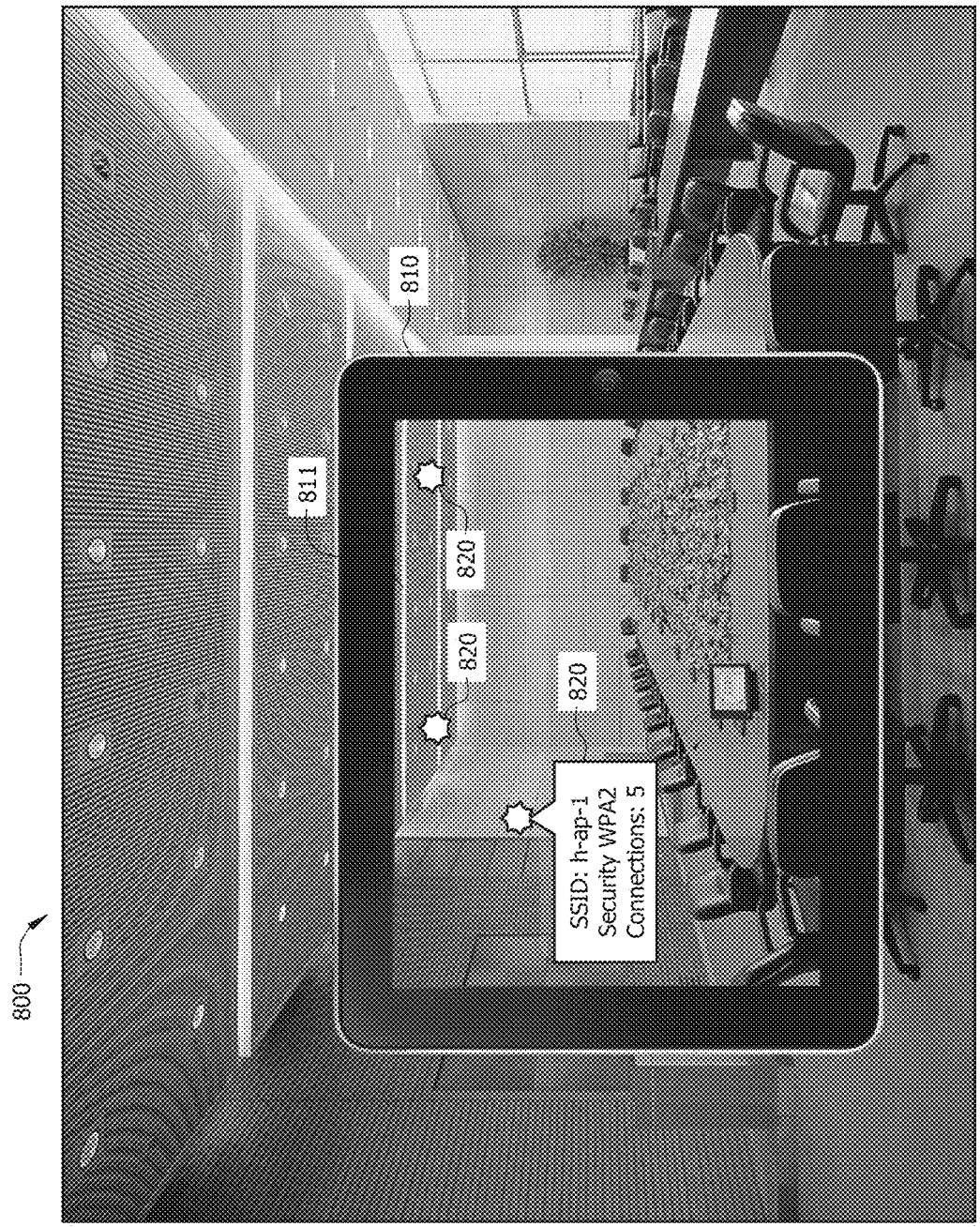
FIG. 8 is a schematic diagram of an embodiment of a composite image comprising network data.

FIG. 8 is a schematic diagram of an embodiment of a composite image 800 comprising network data 820. Composite image 800 may be the result of block 205 of method 200. A model comprising the network data 820 may be overlaid onto visual data and displayed on the display 811 of a UE 810, which may be substantially similar to UE 110 and/or UE 410. The model may be transparent so that only the network data 820 and the visual data may be perceived by the user. The congruence between the transparent model and the location may be maintained during UE movement as discussed above. As the network data may be loaded into the model, the position of the network data may be maintained relative to the NEs in the location. As a result, the user may view NEs in the visual data on the display that may be obscured from view by features of the location.

For example, the visual input of a UE may comprise a video camera. A user may point the video camera at an object or structure such as a wall, a desk, a ceiling, etc. If a NE (e.g. NE 130) is located behind the object, the video camera of the UE may not record the NE (e.g. as visual data) because the NE is obscured from view. However, the network data associated with the NE may indicate the physical location of the NE, which may allow the UE to overlay a representation of the NE and/or the NE's network data onto video recorded by the NE to create a composite image (e.g. a single image or a composite video). The composite image may then be displayed to the user, which may allow the user to see representations of the obscured NE.

Figure 9:
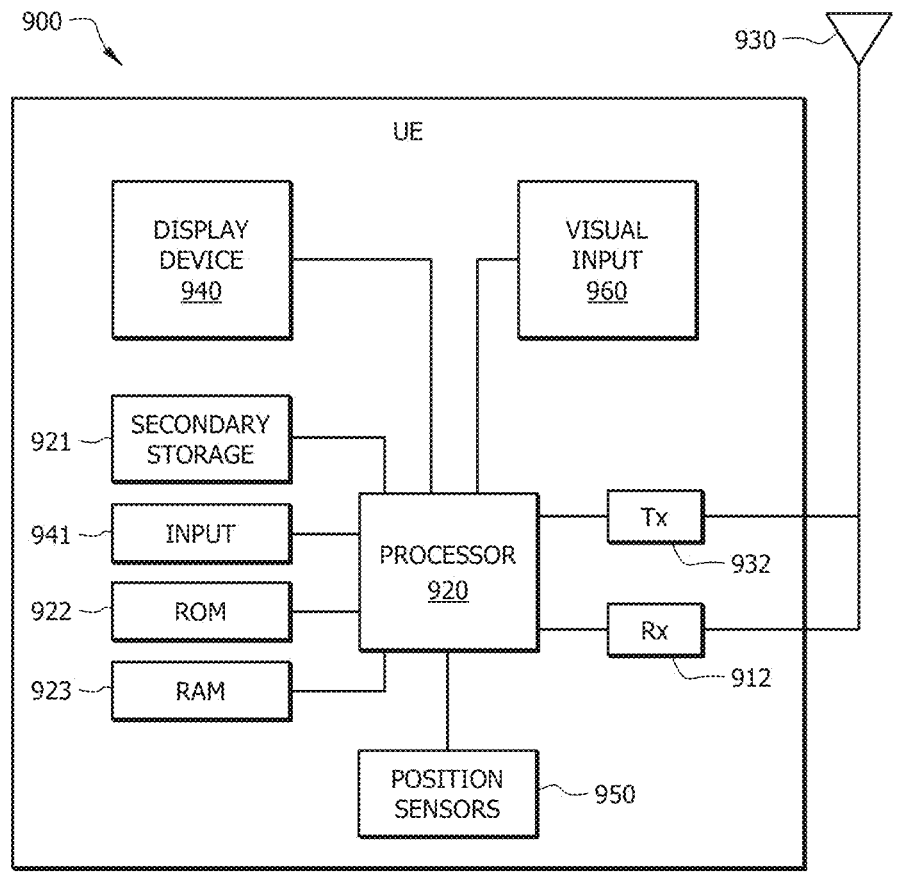
FIG. 9 is a schematic diagram of an embodiment of a UE.

FIG. 9 is a schematic diagram of an embodiment of a UE 900. UE 900 may comprise a two-way wireless communication device having voice and/or data communication capabilities. In some aspects, voice communication capabilities are optional. The UE 900 generally has the capability to communicate with other computer systems on the Internet and/or other networks. Depending on the exact functionality provided, the UE 900 may be referred to as a data messaging device, a tablet computer, a two-way pager, a wireless e-mail device, a cellular telephone with data messaging capabilities, a wireless Internet appliance, a wireless device, a smart phone, a mobile device, or a data communication device, as examples.

UE 900 may comprise a processor 920 (which may be referred to as a central processor unit or CPU) that may be in communication with memory devices including secondary storage 921, read only memory (ROM) 922, and random access memory (RAM) 923. The processor 920 may be implemented as one or more CPU chips, one or more cores (e.g., a multi-core processor), or may be part of one or more application specific integrated circuits (ASICs) and/or digital signal processors (DSPs). The processor 920 may be configured to implement any of the schemes described herein, and may be implemented using hardware, software, firmware, or combinations thereof.

The secondary storage 921 may be comprised of one or more solid state drives and/or disk drives which may be used for non-volatile storage of data and as an over-flow data storage device if RAM 923 is not large enough to hold all working data. Secondary storage 921 may be used to store programs that are loaded into RAM 923 when such programs are selected for execution. The ROM 922 may be used to store instructions and perhaps data that are read during program execution. ROM 922 may be a non-volatile memory device may have a small memory capacity relative to the larger memory capacity of secondary storage 921. The RAM 923 may be used to store volatile data and perhaps to store instructions. Access to both ROM 922 and RAM 923 may be faster than to secondary storage 921.

UE 900 may be any device that communicates data (e.g., packets) wirelessly with a network. The UE 900 may comprise a receiver (Rx) 912, which may be configured for receiving data, packets, or frames from other components. The receiver 912 may be coupled to the processor 920, which may be configured to process the data and determine to which components the data is to be sent. The UE 900 may also comprise a transmitter (Tx) 932 coupled to the processor 920 and configured for transmitting data, packets, or frames to other components. The receiver 912 and transmitter 932 may be coupled to an antenna 930, which may be configured to receive and transmit wireless (radio) signals.

The UE 900 may also comprise a device display 940 coupled to the processor 920, for displaying output thereof to a user. The device display 920 may comprise a Color Super Twisted Nematic (CSTN) display, a thin film transistor (TFT) display, a thin film diode (TFD) display, a light emitting diode (LED) display, an organic light-emitting diode (OLED) display, an active-matrix OLED display, or any other display screen. The device display 940 may display in color or monochrome and may be equipped with a touch sensor based on resistive and/or capacitive technologies.

The UE 900 may further comprise input devices 941, coupled to the processor 920, which may allow the user to input commands to the UE 900. In the case that the display device 940 comprises a touch sensor, the display device 940 may also be considered an input device 941. In addition to and/or in the alternative, an input device 941 may comprise a mouse, trackball, built-in keyboard, external keyboard, and/or any other device that a user may employ to interact with the UE 900.

The UE may further comprise a visual input 960 configured to capture motion or stop photography in the visual input's 960 field of view as visual data. For example, the visual input 960 may comprise a video camera or still camera. The visual input 960 may be coupled to the processor 920, and may forward visual data captured by the visual input 960 to the processor for processing, storage, transmission, and/or display.

The UE 900 may further comprise position sensors 950. Position sensors 950 may be coupled to the processor and may be configured to determine the physical location, height, vertical facing and/or horizontal facing of the UE 900 and/or of the visual input 960 (e.g. field of view data) at a given time. Position sensors 950 may comprise global position system (GPS) sensors, magnetometers, accelerometers, gyroscopes, and/or other sensors. Position sensors 950 may collect and transmit position and/or motion data collected to the processor 920 to indicate a change in the UE's 900 position and/or motion experience by the UE 900, respectively.

Figure 10:
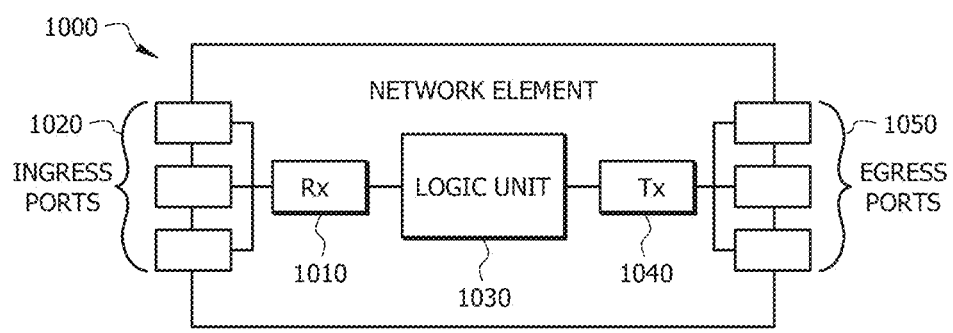
FIG. 10 is a schematic diagram of an embodiment of a NE.

FIG. 10 is a schematic diagram of an embodiment of an NE 1000, which may function as a NE in network 100 and may be employed to implement NE 130-131, server 122, and/or an AP 121. One skilled in the art will recognize that the term NE encompasses a broad range of devices of which NE 1000 is merely an example. NE 1000 is included for purposes of clarity of discussion, but is in no way meant to limit the application of the present disclosure to a particular NE embodiment or class of NE embodiments. At least some of the features/methods described in the disclosure may be implemented in a network apparatus or component, such as an NE 1000. For instance, the features/methods in the disclosure may be implemented using hardware, firmware, and/or software installed to run on hardware. The NE 1000 may be any device that transports frames through a network, e.g., a switch, router, bridge, server, etc. As shown in FIG. 10, the NE 1000 may comprise a receiver (Rx) 1010 coupled to plurality of ingress ports 1020 for receiving frames from other nodes, a logic unit 1030 coupled to the receiver to determine which nodes to send the frames to, and a transmitter (Tx) 1040 coupled to the logic unit 1030 and to plurality of egress ports 1050 for transmitting frames to the other nodes. The logic unit 1030 may comprise one or more multi-core processors and/or memory devices, which may function as data stores. The ingress ports 1020 and/or egress ports 1050 may contain electrical and/or optical transmitting and/or receiving components. NE 1000 may or may not be a routing component that makes routing decisions.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A user equipment (UE) comprising:
   a display;
   an input device configured to receive user input;
   a visual input configured to capture motion or still photography as visual data; and
   a processor coupled to the display, the input device, and the visual input, wherein the processor is configured to:
      receive the visual data from the visual input;
      overlay a model comprising network data onto the visual data to create a composite image, wherein the network data comprises a position of a network element (NE) and transmission range data associated with the NE, and wherein the model is aligned to the visual data based on user input received from the input device of zooming a view of the model to align to the visual data;
      transmit the composite image to the display; and
      display the composite image comprising the position of the NE and the transmission range data associated with the NE.

2. The UE of claim 1, further comprising a memory device coupled to the processor, wherein the model is received from the memory device prior to overlaying the model onto the visual data.

3. The UE of claim 1, further comprising a receiver coupled to the processor, wherein the receiver is configured to receive data communications from a server, and wherein the model s received from the server prior to overlaying the model onto the visual data.

4. The UE of claim 1, wherein the network data is loaded into the model after the model is aligned and prior to overlaying the model onto the visual data.

5. The UE of claim 4, further comprising a receiver coupled to the processor, wherein the receiver is configured to receive data communications from a server, and wherein the network data is received from the server.

6. The UE of claim 1, wherein the model comprises a three dimensional (3D) model of a location.

7. The UE of claim 6, wherein e location is a building.

8. The UE of claim 1, further comprising position sensors coupled to the processor, wherein the position sensors are configured to indicate UE motion by transmitting motion data to the processor, and wherein the processor is further configured to maintain the model alignment based on the motion data.

9. The UE of claim 8, wherein the motion data indicates motion of the UE with respect to a horizontal axis, a vertical axis, a lateral axis, or combinations thereof, and wherein the model alignment is maintained by moving the model to correspond with the UE motion.

10. The UE of claim 9, wherein the motion data comprises measurements, and wherein the congruence of the model and the UE is maintained based on consecutive average measurements.

11. The UE of claim 9, wherein the model is not visible in a displayed composite image.

12. A method comprising:
   importing a model of a location, wherein the location comprises a plurality of physical features, and wherein the model comprises a plurality of features that represent the plurality of physical features of the location;
   overlaying the model onto a first visual data received from a visual input to create a first composite image and displaying the first composite image to a user;
   receiving from the user, via an input device, a first user input that aligns a feature of the model with a physical feature of the location in the first visual data by zooming a view of the model to align to the first visual data;
   loading network data into the model, wherein the network data comprises a position of a network element (NE) and transmission range data associated with the NE; and
   overlaying the model, as aligned by the user, onto a second visual data received from the visual input to create a second composite image and displaying the second composite image to the user.

13. The method of claim 12, wherein the model is overlaid onto the first visual data based on a second user input received from the input device.

14. The method of claim 12, wherein the model comprises position data, and wherein the model is overlaid onto the first visual data based on the position data received from a position sensor.

15. The method of claim 12, further comprising calibrating to maintain the alignment of the model to the first visual data.

16. The method of claim 12, wherein the first user input aligns the model feature with the location feature by changing a size or orientation of the model feature to correspond with a size or orientation of the location feature.

17. The method of claim 12, wherein the model comprises a representation of a geographic area.

* * * * *